(12) United States Patent
Uchiyama et al.

(10) Patent No.: US 11,062,868 B2
(45) Date of Patent: Jul. 13, 2021

(54) ELECTROMAGNETIC RELAY

(71) Applicant: FUJITSU COMPONENT LIMITED, Tokyo (JP)

(72) Inventors: Yusuke Uchiyama, Tokyo (JP); Masahide Mochizuki, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 305 days.

(21) Appl. No.: 16/227,298

(22) Filed: Dec. 20, 2018

(65) Prior Publication Data
US 2019/0221391 A1    Jul. 18, 2019

(30) Foreign Application Priority Data

Jan. 17, 2018 (JP) .............................. JP2018-005829

(51) Int. Cl.
*H01H 7/16* (2006.01)
*H01H 50/12* (2006.01)
(Continued)

(52) U.S. Cl.
CPC ............ *H01H 50/12* (2013.01); *H01H 50/14* (2013.01); *H01H 50/28* (2013.01); *H01H 50/56* (2013.01); *H01H 50/58* (2013.01); *H01H 50/648* (2013.01); *H01R 13/03* (2013.01); *B32B 15/018* (2013.01); *H01H 1/10* (2013.01); *H01H 2201/024* (2013.01); *H01H 2203/004* (2013.01);
(Continued)

(58) Field of Classification Search
CPC ........ H01H 50/12; H01H 50/14; H01H 50/28; H01H 50/56; H01H 50/58; H01H 50/648; H01H 1/10; H01H 2201/024; H01H 2203/004; H01H 2209/002; H01H 2239/072; H01R 13/03; B32B 15/018
USPC ........................................................ 335/156
See application file for complete search history.

(56) References Cited

U.S. PATENT DOCUMENTS 2,454,788 A    11/1948   Frese
2,577,570 A  * 12/1951   Eisenberg ............ G03D 15/043
                                                    156/502
(Continued)

FOREIGN PATENT DOCUMENTS

CN    206758289 U    12/2017
EP        2533262       12/2012
(Continued)

*Primary Examiner* — Shawki S Ismail
*Assistant Examiner* — Lisa N Homza
(74) *Attorney, Agent, or Firm* — IPUSA, PLLC

(57) ABSTRACT

An electromagnetic relay includes a fixed contact module including a fixed contact, a movable contact module including a movable contact disposed to face the fixed contact, an armature formed of a magnetic material and configured to move the movable contact module to bring the movable contact into and out of contact with the fixed contact, and an electromagnet configured to generate a magnetic field to move the armature. At least one of the fixed contact module and the movable contact module includes a joint at which different components are joined by riveting, and a film with a thermal conductivity higher than, the thermal conductivity of the fixed contact module and the movable contact module is formed on at least one of the fixed contact module and the movable contact module including the joint.

4 Claims, 12 Drawing Sheets

(51) Int. Cl.
*H01H 50/14* (2006.01)
*H01H 50/64* (2006.01)
*H01H 50/58* (2006.01)
*H01H 50/56* (2006.01)
*H01H 50/28* (2006.01)
*H01R 13/03* (2006.01)
*H01H 1/10* (2006.01)
*B32B 15/01* (2006.01)

(52) U.S. Cl.
CPC . *H01H 2209/002* (2013.01); *H01H 2239/072* (2013.01)

(56) References Cited

U.S. PATENT DOCUMENTS

| | | | | |
|---|---|---|---|---|
| 2,874,905 | A * | 2/1959 | Thornbery | F23N 5/105 236/9 R |
| 3,750,060 | A * | 7/1973 | Pfenning | H01H 51/06 335/135 |
| 4,163,223 | A * | 7/1979 | Sato | G10K 9/13 340/384.73 |
| 4,734,668 | A * | 3/1988 | Dittmann | H01H 50/28 335/128 |
| 5,216,396 | A * | 6/1993 | Stahly | H01H 50/14 335/128 |
| 5,889,453 | A * | 3/1999 | Siepmann | H01H 50/021 335/83 |
| 6,225,880 | B1 * | 5/2001 | Kern | H01H 49/00 335/78 |
| 6,266,867 | B1 * | 7/2001 | Kern | H01H 49/00 29/602.1 |
| 9,583,293 | B2 | 2/2017 | Li et al. | |
| 2015/0228431 | A1 * | 8/2015 | Suzuki | H01H 50/58 335/133 |
| 2015/0294823 | A1 * | 10/2015 | Bachman | H01H 50/44 335/78 |
| 2016/0186294 | A1 | 6/2016 | Maki et al. | |
| 2017/0352972 | A1 | 12/2017 | Kato et al. | |
| 2019/0103240 | A1 * | 4/2019 | Li | H01H 50/56 |

FOREIGN PATENT DOCUMENTS

| | | |
|---|---|---|
| JP | 2015-036433 | 2/2015 |
| JP | 2015-207378 | 11/2015 |
| JP | 2016-129119 | 7/2016 |

\* cited by examiner

ELECTROMAGNETIC RELAY

CROSS-REFERENCE TO RELATED APPLICATION

The present application is based on and claims priority to Japanese Patent Application No. 2018-005829, filed on Jan. 17, 2018, the entire contents of which are incorporated herein by reference.

BACKGROUND OF THE INVENTION

1. Field of the Invention

An aspect of this disclosure relates to an electromagnetic relay.

2. Description of the Related Art

An electromagnetic relay is an electronic component that turns on and off electric power using an electromagnet. An electromagnetic relay may include a fixed contact, a movable contact, an armature, and an electromagnet (see, for example, Japanese Laid-Open Patent Publication No. 2015-207378, Japanese Laid-Open Patent Publication No. 2016-129119, and Japanese Laid-Open Patent Publication No. 2015-036433). When the electromagnet generates a magnetic field, the armature is attracted to the electromagnet and moves a movable spring. As a result, the movable contact contacts the fixed contact, and the electromagnetic relay is turned on. When the electromagnet stops generating the magnetic field, the armature moves away from the electromagnet due to the restoring force of a spring, and the movable contact moves away from the fixed contact. As a result, the movable contact and the fixed contact are brought out of contact with each other, and the electromagnetic relay is turned off.

Japanese Laid-Open Patent Publication No. 2015-207378 discloses an electromagnetic relay that includes a card connected to an armature.

When an overcurrent or a high current flows into an electromagnetic relay, a fixed terminal connected to a fixed contact and/or a movable spring connected to a movable contact may be heated. If heat is transferred from the heated fixed terminal and/or the heated movable spring to a resin part of the electromagnetic relay, the resin part may be melted or deformed. Accordingly, there is a demand for a reliable electromagnetic relay where a resin part is prevented from being melted or deformed even when heat is generated.

SUMMARY OF THE INVENTION

In an aspect of this disclosure, there is provided an electromagnetic relay that includes a fixed contact module including a fixed contact, a movable contact module including a movable contact disposed to face the fixed contact, an armature formed of a magnetic material and configured to move the movable contact module to bring the movable contact into and out of contact with the fixed contact, and an electromagnet configured to generate a magnetic field to move the armature. At least one of the fixed contact module and the movable contact module includes a joint at which different components are joined by riveting, and a film with a thermal conductivity higher than the thermal conductivity of the fixed contact module and the movable contact module is formed on at least one of the fixed contact module and the movable contact module including the joint.

DESCRIPTION OF EMBODIMENTS

Embodiments of the present invention are described below with reference to the accompanying drawings. Throughout the drawings, the same reference number is assigned to the same component, and repeated descriptions of the same component are omitted.

Figure 1:
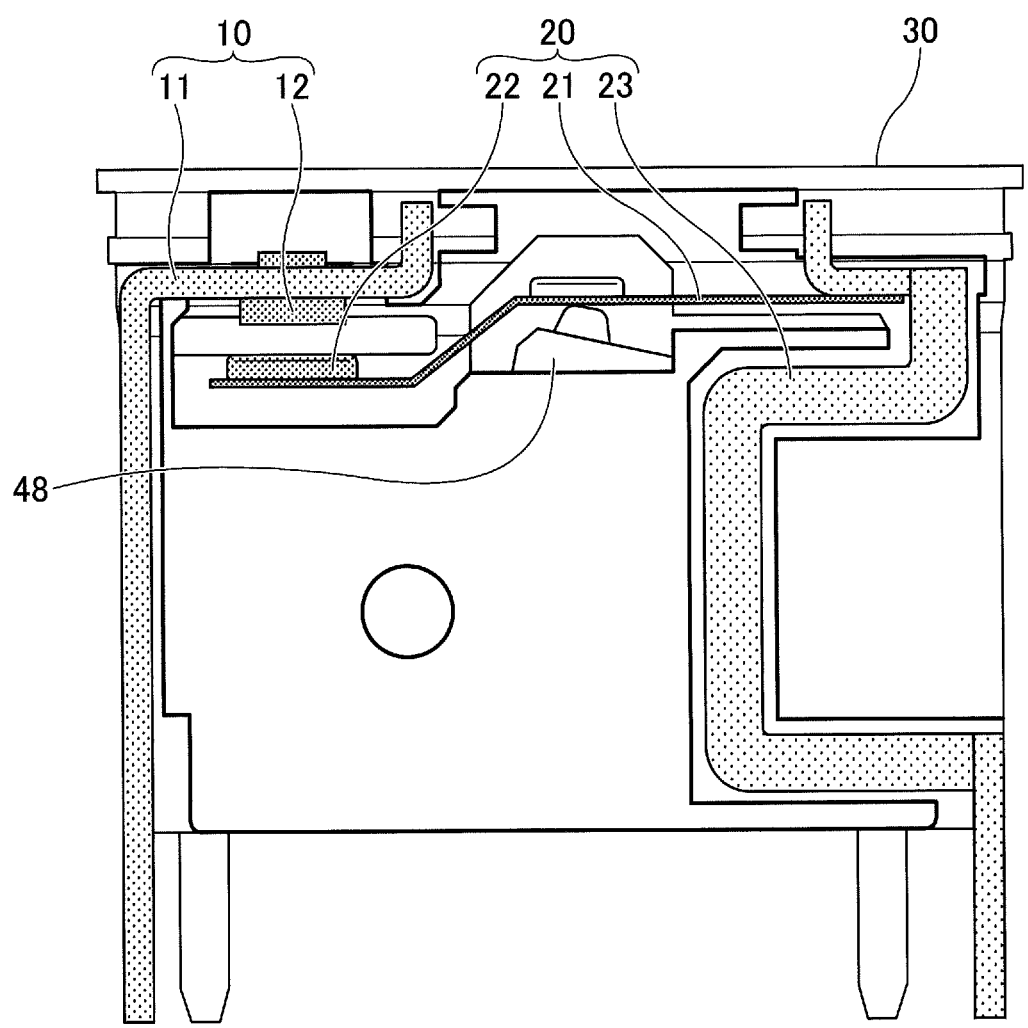
FIG. 1 is a front elevational view of an electromagnetic relay according to an embodiment.
Figure 2:
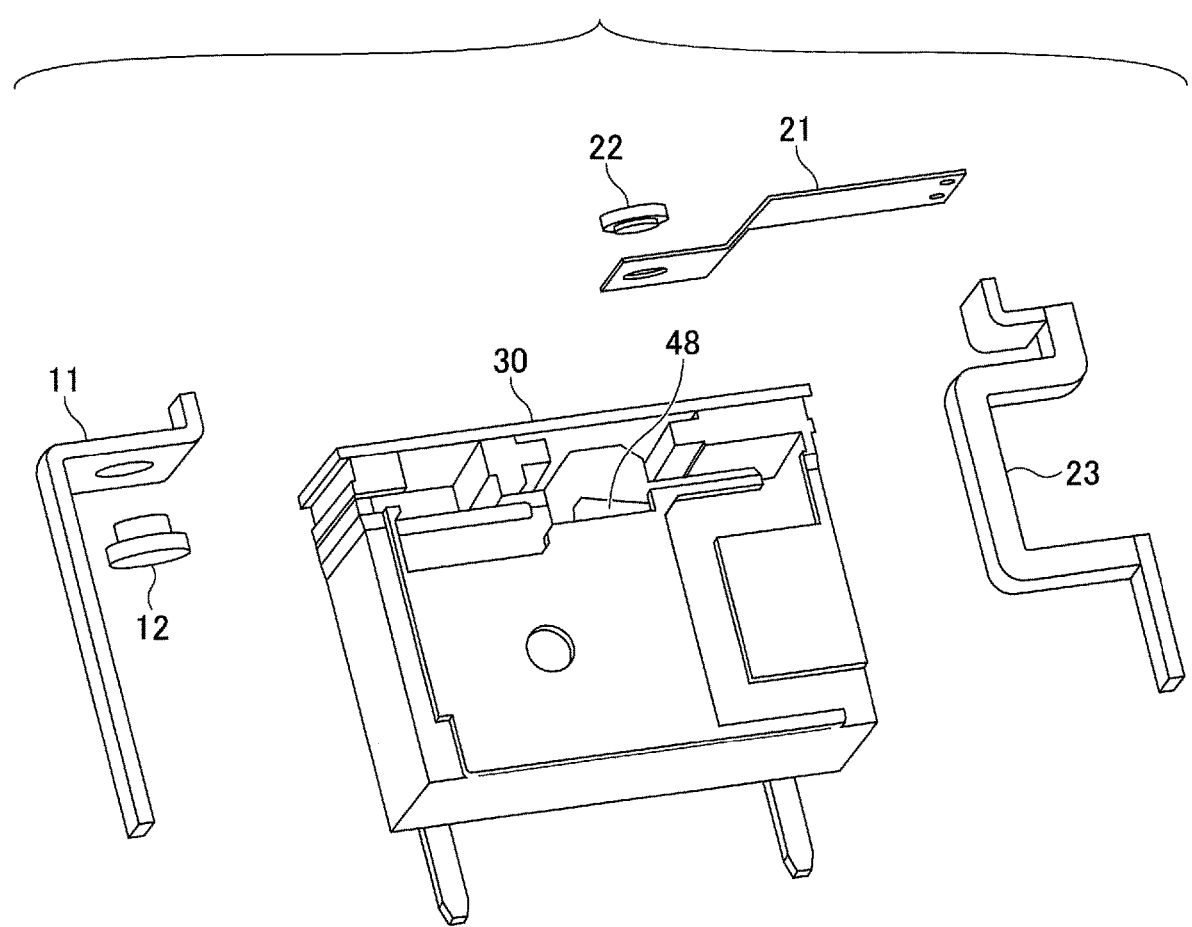
FIG. 2 is an exploded perspective view of the electromagnetic relay.
Figure 3:
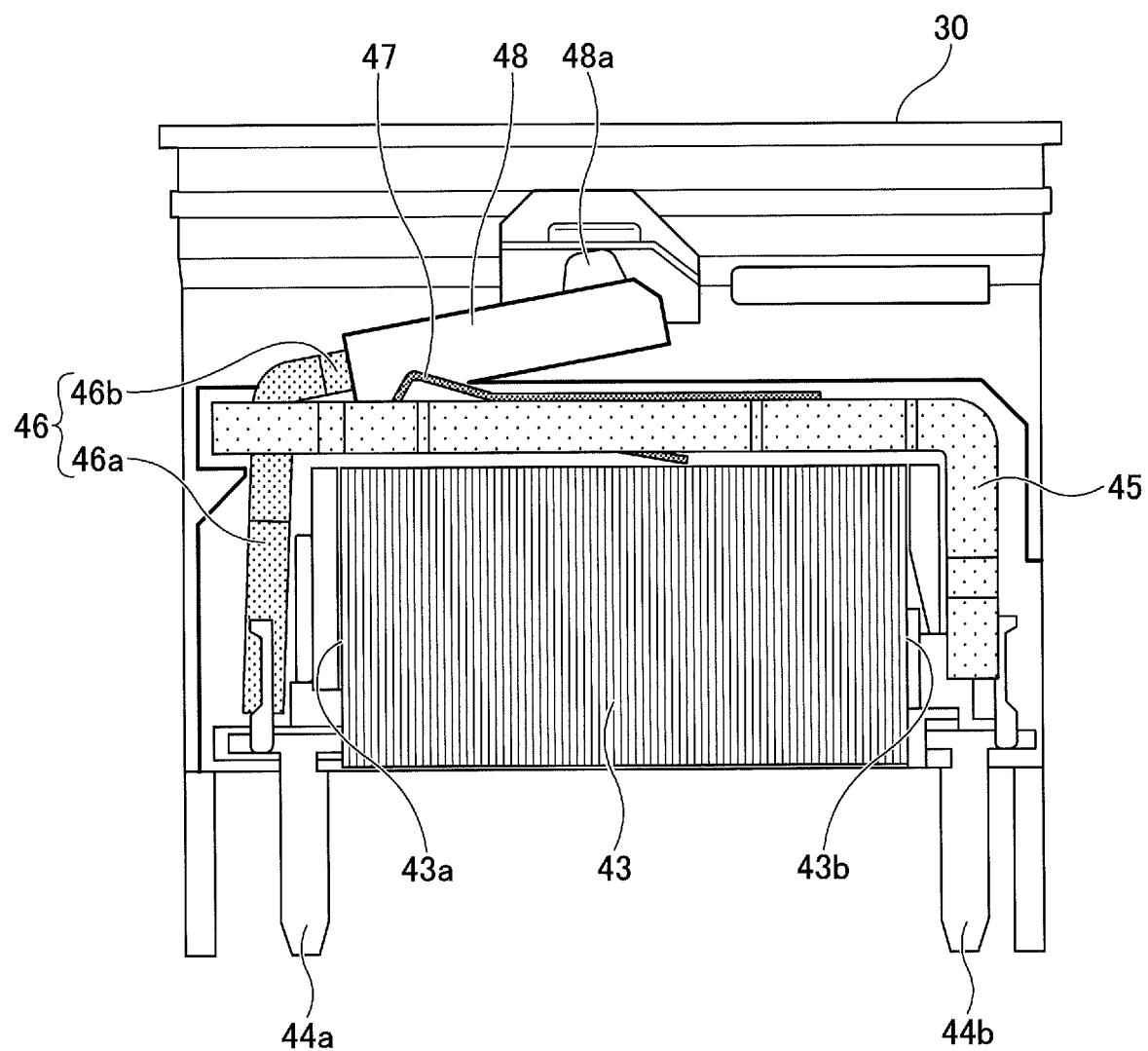
FIG. 3 is a rear elevational view of the electromagnetic relay.
Figure 4:
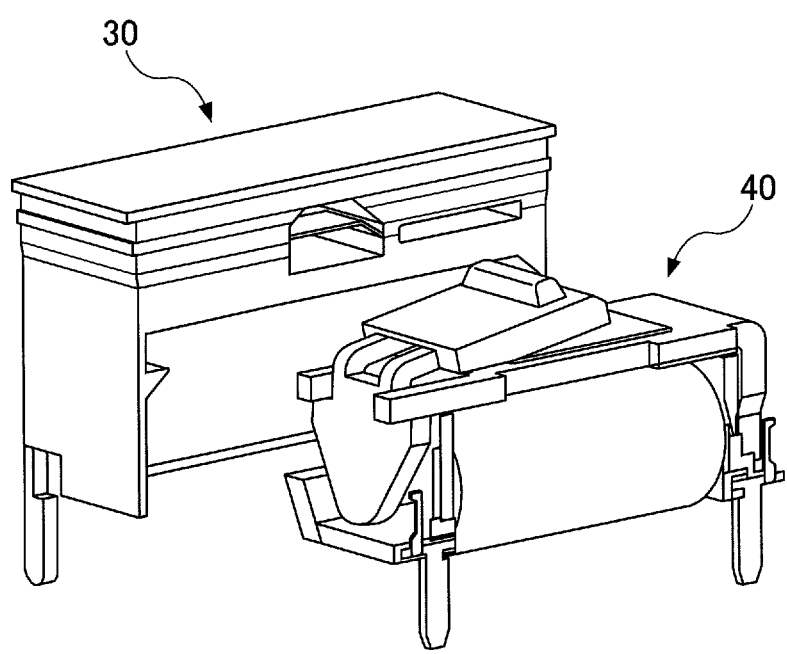
FIG. 4 is an exploded perspective view of the electromagnetic relay.
Figure 5:
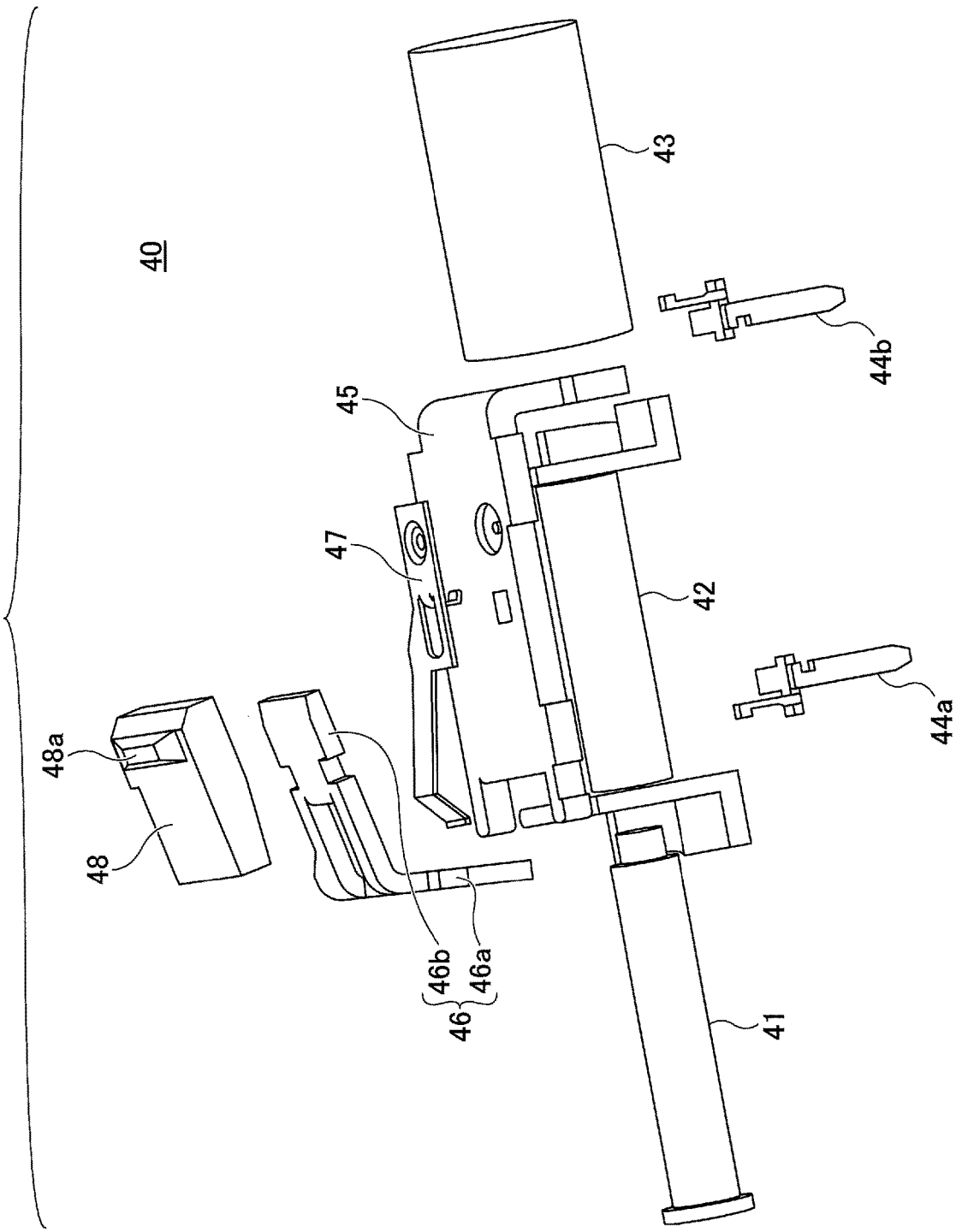
FIG. 5 is an exploded perspective view of an electromagnet module of the electromagnetic relay.

An electromagnetic relay according to an embodiment is described below with reference to FIGS. 1 through 5. FIG. 1 is a front elevational view of an electromagnetic relay according to an embodiment, and FIG. 2 is an exploded perspective view of the electromagnetic relay. FIG. 3 is a rear elevational view, FIG. 4 is an exploded perspective view, and FIG. 5 is an exploded perspective view of an electromagnet module of the electromagnetic relay.

The electromagnetic relay includes a fixed contact module 10 including a fixed terminal 11 and a fixed contact 12 connected to the fixed terminal 11; a movable contact module 20 including a movable spring 21, and a movable contact 22 and a movable spring terminal 23 that are connected to the movable spring 21; and an electromagnet module 40 including an armature 46. Together with the electromagnet module 40, the fixed contact module and the movable contact module 20 are disposed in a base block 30 formed of a resin such that the movable contact 22 faces the fixed contact 12.

The electromagnet module 40 includes a spool 42, an iron core 41 disposed in the spool 42, and a coil 43 wound around the spool 42. Coil terminals 44a and 44b are attached to the corresponding ends of the coil 43. Surfaces 43a and 43b at the longitudinal ends of the spool 42 function as the poles of an electromagnet implemented by the electromagnet module 40.

An L-shaped yoke 45 is provided outside of the coil 43. The armature 46 is formed of a magnetic material, and includes a portion 46a that extends along the surface 43a and a portion 46b that extends over the side surface of the coil 43. The armature 46 is bent at a position between the portion 46a and the portion 46b so as to open at an obtuse angle (the portion 46a and the portion 46b form an obtuse interior angle). The armature 46 is attached to the yoke 45 such that the armature 46 can rotate on a fulcrum 46c near the bent position. A hinge spring 47 is attached to the yoke 45. The hinge spring 47 biases the armature 46 in such a direction that the portion 46a moves away from a pole (the surface 43a) of the electromagnet and the portion 46b moves away from the movable spring 21.

A card 48 is attached to the portion 46b such that the card 48 moves along with the portion 46b. The card 48 includes a protrusion 48a on a side facing the movable spring 21. The portion 46b moves toward and away from the movable spring 21. When the portion 46b comes close to the movable spring 21, the card 48 moving along with the portion 46b contacts the movable spring 21. The card 48 is an insulator between the armature 46 and the movable spring 21 and is formed of, for example, an insulating resin such as polybutylene terephthalate (PBT) or liquid crystal polymer (LCP).

The electromagnetic relay is packaged by placing the electromagnetic relay in an insulating case such that the ends of the coil terminals 44a and 44b, the fixed terminal 11, and the movable spring terminal 23 are exposed outside of the case.

Figure 6A:
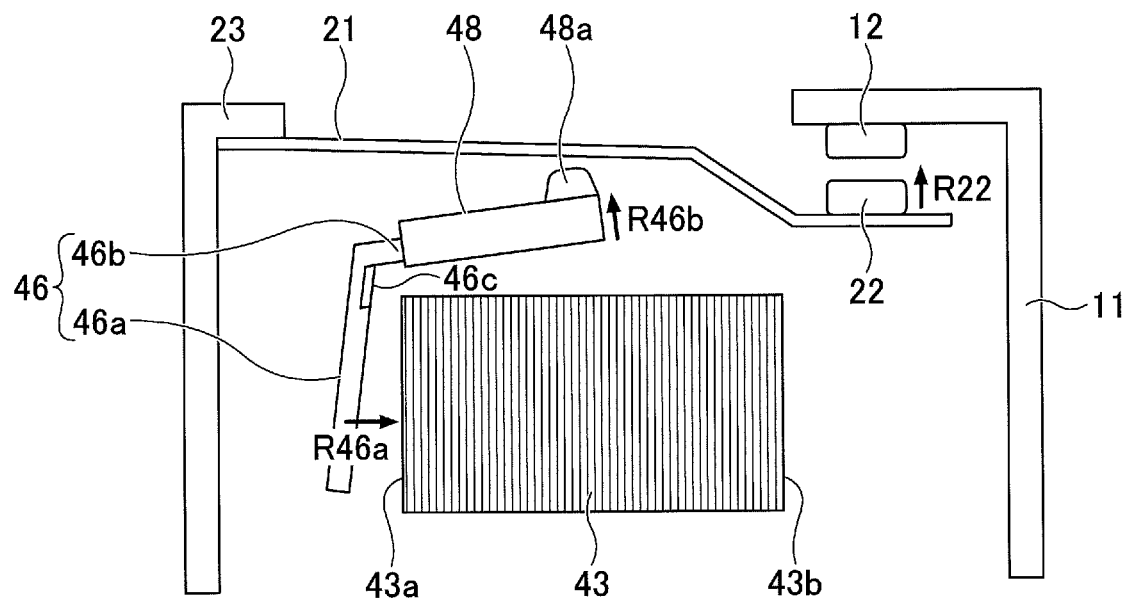
FIGS. 6A and 6B are drawings illustrating operations of the electromagnetic relay.
Figure 6B:
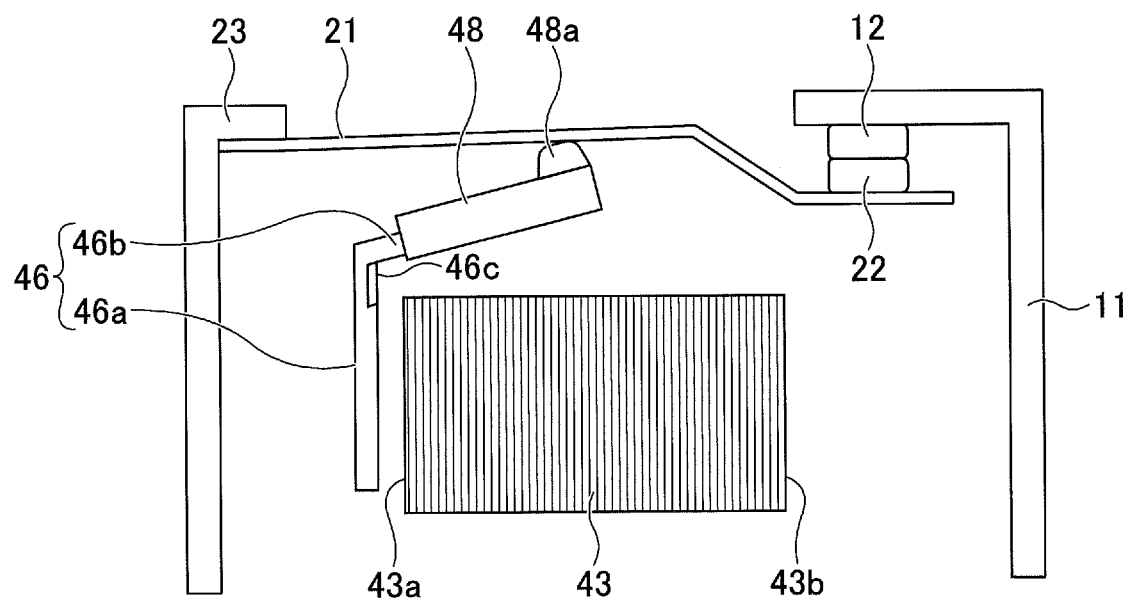

Next, operations of the electromagnetic relay are described. FIGS. 6A and 6B are drawings illustrating operations of the electromagnetic relay. As illustrated in FIG. 6A, when no electric current is supplied to the coil 43, the portion 46a is biased by the hinge spring 47 in a direction away from the surface 43a.

In this state, the portion 46b and the card 48 are biased in a direction away from the movable spring 21. Also, the protrusion 48a is not in contact with the movable spring 21, and the movable contact 22 is not in contact with the fixed contact 12.

When an electric current is supplied to the coil 43 via the coil terminals 44a and 44b, a magnetic field is generated by the electromagnet, and the portion 46a is attracted toward the surface 43a in a direction R46a.

Accordingly, the armature 46 rotates on the fulcrum 46c. That is, the card 48 moves in a direction toward the movable spring 21 in a direction R46b. Then, the protrusion 48a contacts and presses the movable spring 21 in the direction R46b and thereby moves the movable spring 21. As a result, the movable contact 22 moves toward the fixed contact 12 in a direction R22 and contacts the fixed contact 12 as illustrated in FIG. 6B. In this state, the fixed terminal 11 is electrically connected to the movable spring terminal 23.

When the supply of the electric current to the coil 43 is stopped, the electromagnet stops generating the magnetic field, the force attracting the portion 46a toward the surface 43a disappears, and the portion 46a moves in a direction away from the surface 43a due to the restoring force of the hinge spring 47.

Also, the card 48 moves in a direction away from the movable spring 21 and the protrusion 48a moves away from the movable spring 21. Due to the restoring force of the movable spring 21 not being pressed by the protrusion 48a, the movable contact 22 moves away from the fixed contact 12, and the movable contact 22 and the fixed contact 12 are brought out of contact with each other. Thus, the electromagnetic relay returns to the state illustrated in FIG. 6A, and the fixed terminal 11 is electrically disconnected from the movable spring terminal 23.

When an overcurrent flows into an electromagnetic relay, conductive parts such as a terminal and a spring may be heated. This problem may be prevented by increasing the cross section of each conductive part or by increasing the radiating area by combining multiple conductive parts. However, this approach increases the size of an electromagnetic relay.

In the present embodiment, at least one of the fixed contact module 10 and the movable contact module 20 includes a joint at which different components are joined by riveting. Also, a film with a thermal conductivity higher than the thermal conductivity of the fixed contact module 10 and the movable contact module 20 is formed on a surface of at least one of the fixed contact module 10 and the movable contact module 20 including the joint.

Figure 7A:
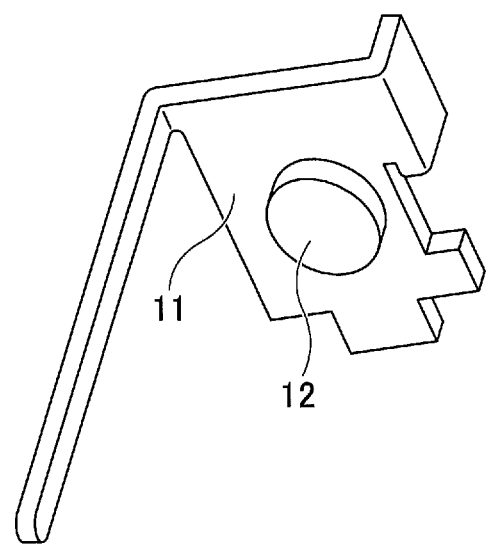
FIGS. 7A and 7B are a perspective view and a cross-sectional view of a fixed contact module according to an embodiment.
Figure 7B:
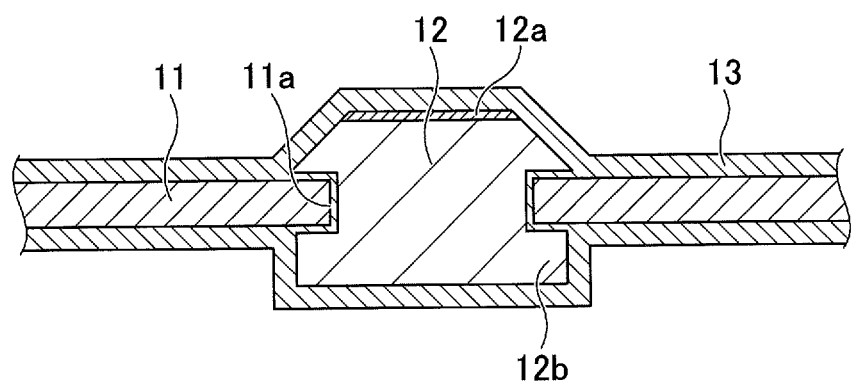

FIGS. 7A and 7B are a perspective view and a cross-sectional view of the fixed contact module 10. In the present embodiment, the fixed contact 12 is joined to the fixed terminal 11 by riveting. An opening 11a for riveting is formed in the fixed terminal 11 formed of, for example, copper. A portion of the fixed contact 12 formed of, for example, copper is fitted into the opening 11a, and the portion is deformed to join the fixed contact to the fixed terminal 11. A contact film 12a containing silver is formed on a surface of the fixed contact 12 that is to contact the movable contact 22. Also, a silver-containing film 13 with a thermal conductivity higher than the thermal conductivity of the fixed terminal 11 and the fixed contact 12 is formed by plating on the entire surfaces of the fixed terminal 11 and the fixed contact 12. The film 13 is formed such that a gap at the joint between the fixed terminal 11 and the fixed contact 12 is filled. The film 13 has a thickness of, for example, about 5 µm to about 10 µm.

Silver may be used as the film 13. The electrical resistivity of silver is 1.59 µΩcm that is lower than the electrical resistivity 1.65 µΩcm of copper. Also, the thermal conductivity of silver is 419 $Wm^{-1}K^{-1}$ that is higher than the thermal conductivity 394 $Wm^{-1}K^{-1}$ of copper. Thus, a conductive material made of or containing silver has a thermal conductivity higher than the thermal conductivity of copper.

Instead of a silver film or the silver-containing film, any other thermal conductive film with a thermal conductivity higher than the thermal conductivity of the fixed terminal 11 and the fixed contact 12 may be formed on the entire surfaces of the fixed terminal 11 and the fixed contact 12.

Figure 8A:
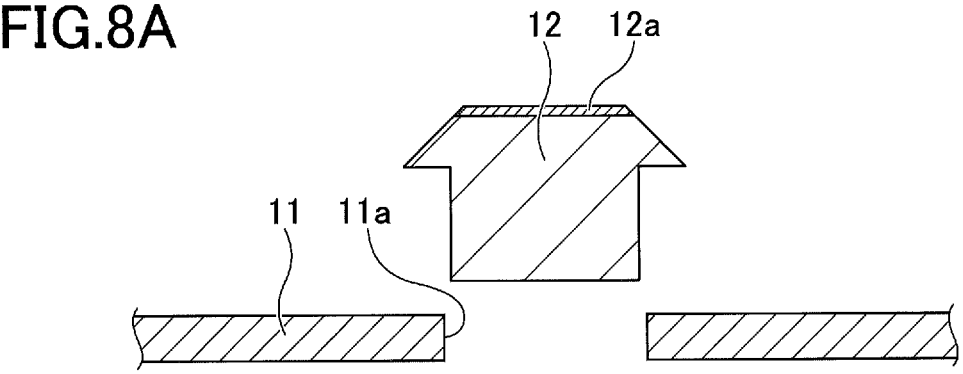
FIGS. 8A through 8D are drawings illustrating a manufacturing process of the fixed contact module.

A method of joining the fixed contact 12 to the fixed terminal 11 is described below. FIGS. 8A through 8D are drawings illustrating a manufacturing process of the fixed contact module 10. First, as illustrated in FIG. 8A, the opening 11a is formed in the fixed terminal 11. The contact film 12a is formed on a surface of the fixed contact 12 that is to contact the movable contact 22.

Figure 8B:
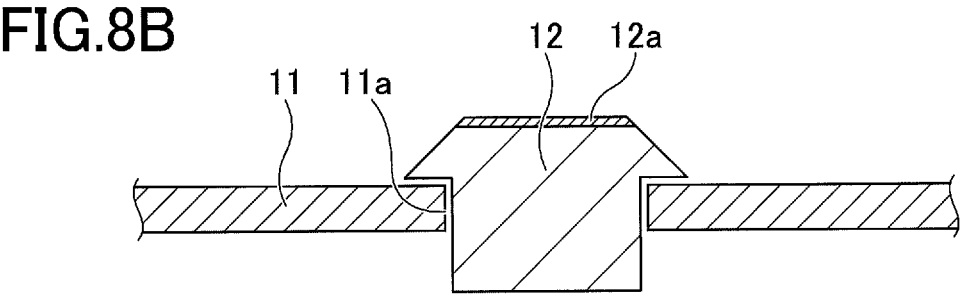
Figure 8C:
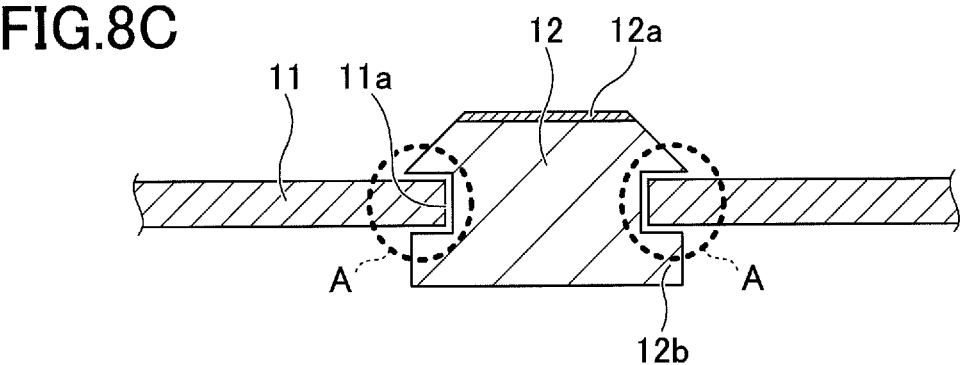
Figure 8D:
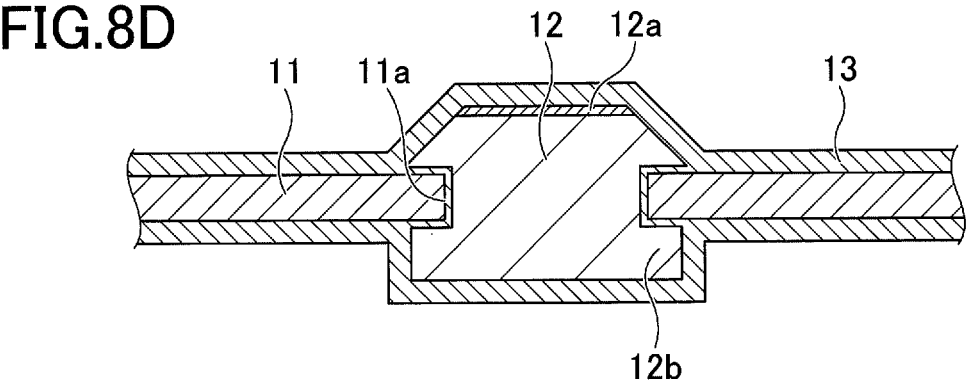

Next, as illustrated in FIG. 8B, a rivet portion of the fixed contact 12 is inserted into the opening 11a.

As illustrated in FIG. 8B, the rivet portion is deformed to join the fixed contact 12 to the fixed terminal 11. When the fixed contact 12 is joined to the fixed terminal 11, a gap may be formed in an area A between the fixed terminal 11 and the fixed contact 12. If a gap is present between the fixed terminal 11 and the fixed contact 12, the contact resistance between the fixed terminal 11 and the fixed contact 12 increases and the thermal conduction between the fixed terminal and the fixed contact 12 decreases. This also applies to other gaps described later.

Next, the film 13 is formed on the entire surfaces of the fixed terminal 11 and the fixed contact 12 by electrolytic plating or electroless plating. The film 13 fills the gap at the joint between the fixed terminal 11 and the fixed contact 12. The fixed contact module 10 is formed through the above process.

Figure 9A:
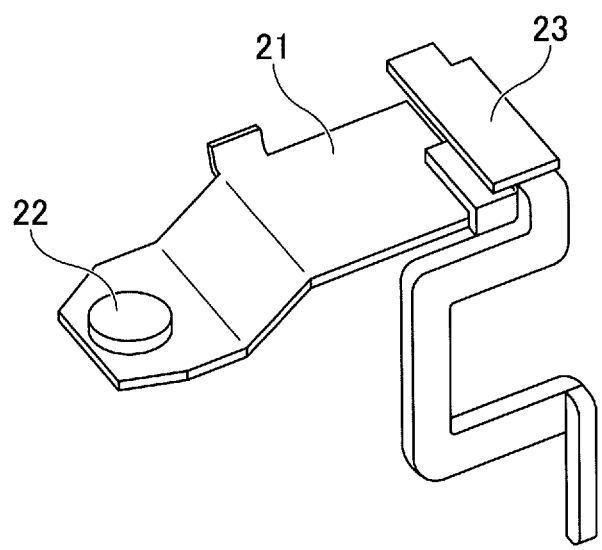
FIGS. 9A and 9B are a perspective view and a cross-sectional view of a movable contact module according to an embodiment.
Figure 9B:
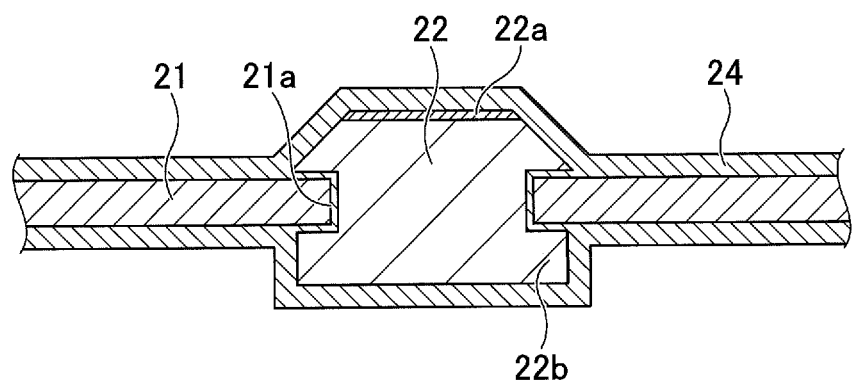

FIGS. 9A and 9B are a perspective view and a cross-sectional view of the movable contact module 20. An opening 21a for riveting is formed in the movable spring 21 formed of, for example, copper. A portion of the movable contact 22 is fitted into the opening 21a, and the movable contact 22 is joined to the movable spring 21 by riveting. The movable spring 21 is joined to the movable spring terminal 23. A contact film 22a containing silver is formed on a surface of the movable contact 22 that is to contact the fixed contact 12. Also, a silver-containing film 24 with a thermal conductivity higher than the thermal conductivity of the movable spring 21, the movable contact 22, and the movable spring terminal 23 is formed on the entire surfaces of the movable spring 21, the movable contact 22, and the movable spring terminal 23. The film 24 is formed such that a gap at the joint between the movable spring 21 and the movable contact 22 is filled. The film 24 has a thickness of, for example, about 5 μm to about 10 μm.

The movable contact 22 is joined to the movable spring 21 by riveting through a process similar to the process for joining the fixed contact 12 to the fixed terminal 11.

Figure 10A:
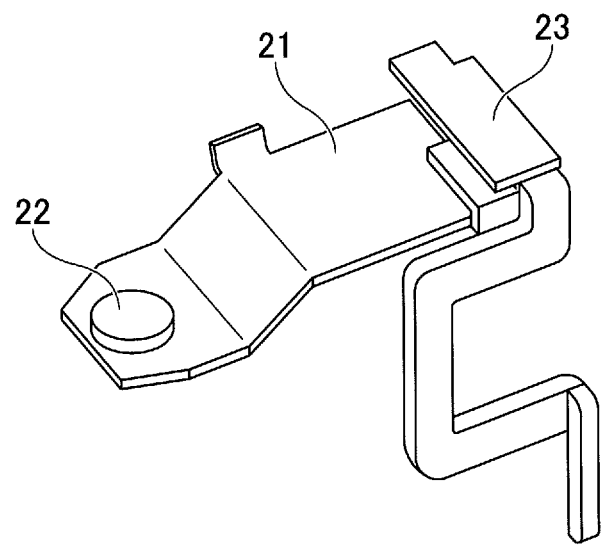
FIGS. 10A and 10B are a perspective view and a cross-sectional view of the movable contact module.
Figure 10B:
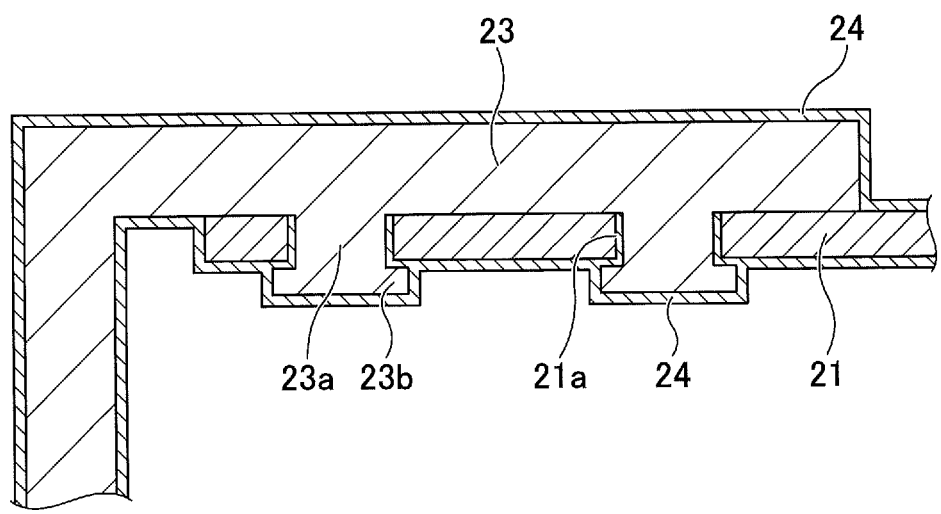

Next, the movable contact module 20 is described further with reference to FIGS. 10A and 10B. FIGS. 10A and 10B are a perspective view and a cross-sectional view of the movable contact module 20. Openings 21a for riveting are formed in the movable spring 21 formed of, for example, copper. Portions of the movable spring terminal 23 formed of, for example, copper are fitted into the openings 21a, and the portions are deformed to join the movable spring 21 to the movable spring terminal 23. Also, the film 24 is formed by, for example, plating on the entire surfaces of the movable spring 21, the movable contact 22, and the movable spring terminal 23. The film 24 is formed such that gaps at the joints between the movable spring 21 and the movable spring terminal 23 are filled. The film 24 has a thickness of, for example, about 5 μm to about 10 μm.

The movable spring 21 is joined to the movable spring terminal 23 through a process similar to the process for joining the fixed contact 12 to the fixed terminal 11 or the process for joining the movable contact 22 to the movable spring 21.

Figure 11A:
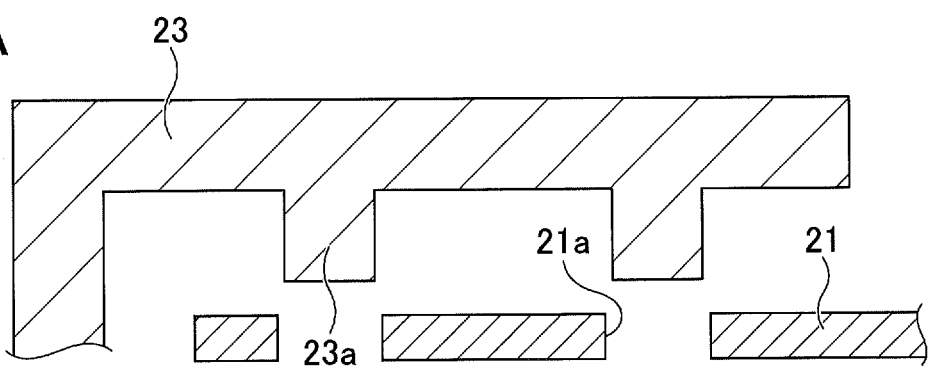
FIGS. 11A through 11D are drawings illustrating a manufacturing process of the movable contact module.

A method of joining the movable spring 21 to the movable spring terminal 23 is described below. FIGS. 11A through 11D are drawings illustrating a manufacturing process of the movable contact module 20. First, as illustrated in FIG. 11A, the openings 21a for riveting are formed in the movable spring 21. The movable spring terminal 23 includes rivet portions 23a.

Figure 11B:
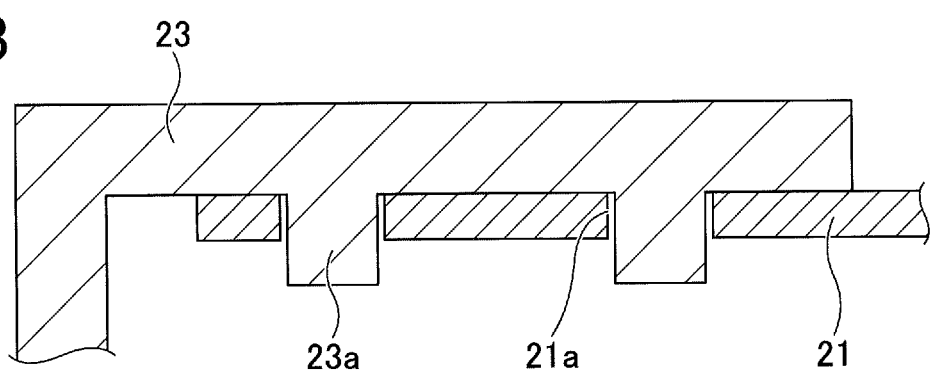

Next, as illustrated in FIG. 11B, the rivet portions 23a are inserted into the openings 21a.

Figure 11C:
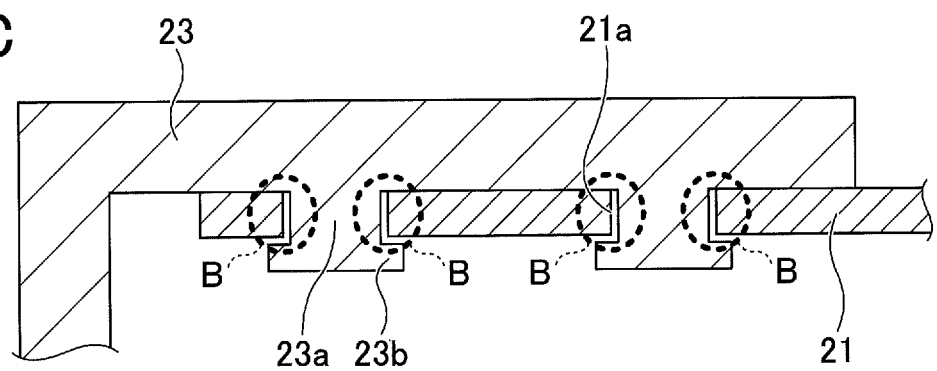
Figure 11D:
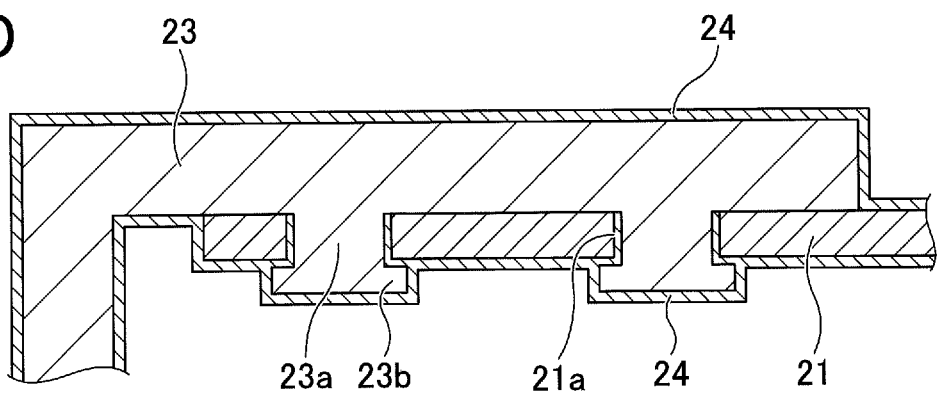

As illustrated in FIG. 11C, the rivet portions 23a are deformed to join the movable spring terminal 23 to the movable spring 21. When the movable spring terminal 23 is joined to the movable spring 21, gaps may be formed in areas B between the movable spring 21 and the movable spring terminal 23. If the gaps are present, the contact resistance between the movable spring 21 and the movable spring terminal 23 increases and the thermal conduction between the movable spring 21 and the movable spring terminal 23 decreases.

Next, the film 24 is formed on the entire surfaces of the movable spring 21 and the movable spring terminal 23 by electrolytic plating or electroless plating. The film 24 fills the gaps at the joints between the movable spring 21 and the movable spring terminal 23. The movable contact module 20 is formed through the above process.

Figure 12A:
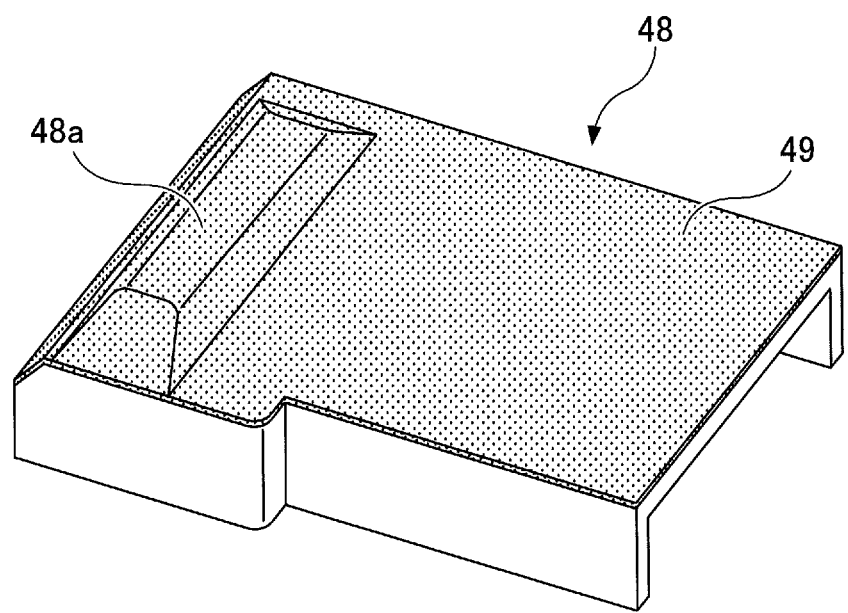
FIGS. 12A and 12B are a perspective view and a cross-sectional view of a card according to an embodiment.
Figure 12B:
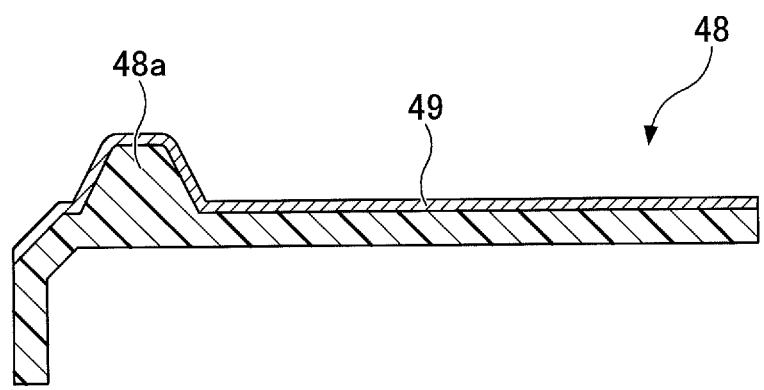

Next, the card 48 is described with reference to FIGS. 12A and 12B. FIGS. 12A and 12B are a perspective view and a cross-sectional view of the card 48.

A thermal conductive film 49 is formed on a surface of the card 48 including the protrusion 48a.

The film 49 contains or is formed of, for example, silver, copper, aluminum, or gold, and preferably contains or is formed of silver.

When an overcurrent flows into an electric circuit and the movable spring is heated, a card formed of a resin and including a protrusion contacts a movable spring is directly affected by the heat. The card formed of a resin has a low thermal conductivity, and the heat is accumulated in the protrusion. In the present embodiment, even when the protrusion 48a contacts the heated movable spring 21 and the heat is transferred to the protrusion 48a, the heat is radiated immediately through the film 49. Accordingly, the present embodiment can prevent the card 48 from being melted or deformed even when an overcurrent flows into the electromagnetic relay and the movable spring 21 is heated, and can improve the reliability of the electromagnetic relay.

Next, a manufacturing method of the card is described. For example, the 49 with a thickness of about 5 μm to about 10 μm is formed by electroless plating on a surface of the card 48. Through this process, the card 48 illustrated in FIGS. 12A and 12B is obtained.

The fixed contact module 10 and the movable contact module 20 of the present embodiment provide common effects (1) through (3) described below.

(1) With the electromagnetic relay of the present embodiment, even when an overcurrent or a high current flows into the electromagnetic relay and the fixed contact module 10 and the movable contact module 20 are heated, the heat is transferred efficiently and radiated immediately through the films 13 and 24. Also, the electromagnetic relay of the present embodiment can reduce the electric resistance by filling the gaps between the fixed terminal 11 and the fixed contact 12 and between the movable spring 21 and the movable contact 22 with the films 13 and 24, and reduce the heat generated when an overcurrent or a high current flows into the electromagnetic relay. Thus, the present embodiment can prevent a resin component of an electromagnetic relay from being melted or deformed and improve the reliability of the electromagnetic relay.

(2) With the electromagnetic relay of the present embodiment, heat generated during a normal operation due to a resistance between the fixed contact 12 and the movable contact 22 can be radiated immediately.

(3) The electromagnetic relay can be manufactured without drastically changing the structure of a currently-available electromagnetic relay. A volume occupied by major components of the electromagnetic relay of the present embodiment is substantially the same as the volume occupied by major components of a currently-available electromagnetic relay. Accordingly, the electromagnetic relay can be manufactured with low costs without increasing the size of the electromagnetic relay.

An electromagnetic relay according to the embodiment of the present invention is described above. However, the present invention is not limited to the disclosed embodiment, and variations and modifications may be made without departing from the scope of the present invention. For example, although the electromagnetic relay of the embodiment includes one pair of a fixed contact and a movable contact, the present invention may also be applied to an electromagnetic relay including two or more pairs of fixed contacts and movable contacts.

What is claimed is:

1. An electromagnetic relay, comprising:
    a fixed contact module including a fixed contact;
    a movable contact module including a movable contact disposed to face the fixed contact;
    an armature formed of a magnetic material and configured to move the movable contact module to bring the movable contact into and out of contact with the fixed contact; and
    an electromagnet configured to generate a magnetic field to move the armature, wherein
    at least one of the fixed contact module and the movable contact module includes at least one joint at which different components are joined by riveting; and
    a film with a thermal conductivity higher than a thermal conductivity of the at least one of the fixed contact module and the movable contact module is formed on the at least one of the fixed contact module and the movable contact module including the joint.

2. The electromagnetic relay as claimed in claim 1, wherein
    the fixed contact module further includes a fixed terminal connected to the fixed contact;
    the movable contact module further includes a movable spring connected to the movable contact and a movable spring terminal connected to the movable spring; and
    the at least one joint includes at least one of a joint between the fixed contact and the fixed terminal, a joint between the movable spring terminal and the movable spring, and a joint between the movable contact and the movable spring.

3. The electromagnetic relay as claimed in claim 1, wherein the film contains silver.

4. The electromagnetic relay as claimed in claim 1, further comprising:
    a card formed of a resin and attached to the armature, the card including a contact part configured to contact the movable contact module,
    wherein a thermal conductive film is formed on a surface of the card including the contact part.

* * * * *